J. S. UPTON.
Grain Separator.
No. 77,419.
Patented April 28, 1868.
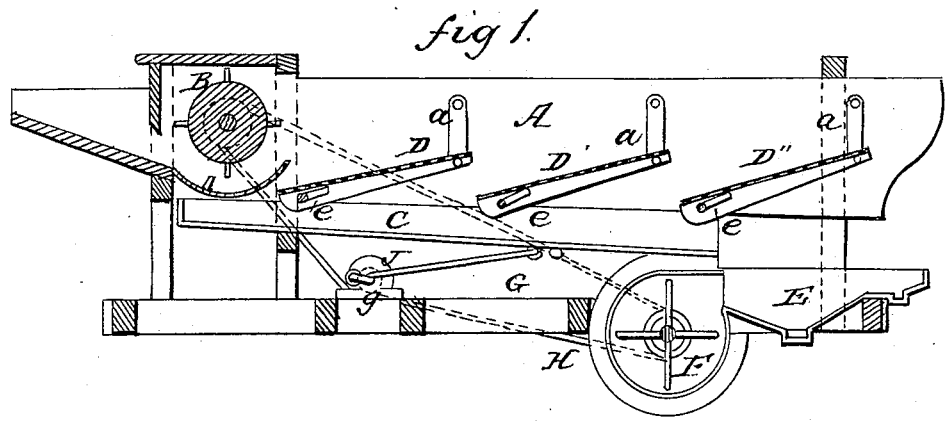
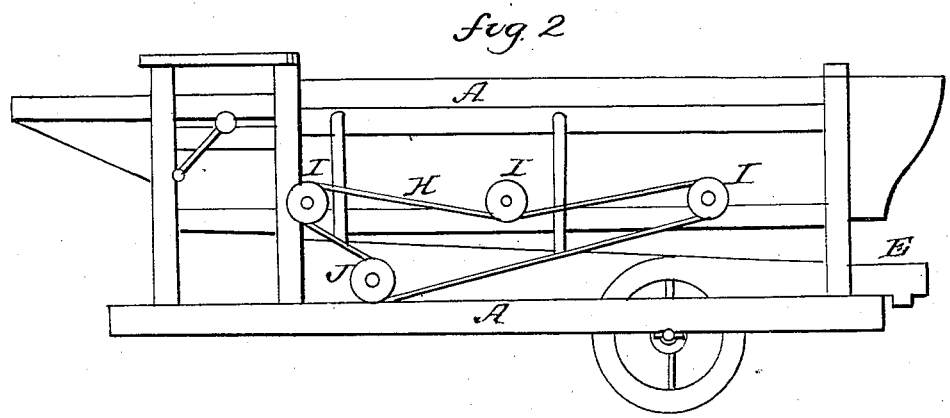

United States Patent Office.

JAMES S. UPTON, OF BATTLE CREEK, MICHIGAN.

Letters Patent No. 77,419, dated April 28, 1868.

IMPROVEMENT IN GRAIN-SEPARATORS.

The Schedule referred to in these Letters Patent and making part of the same.

TO ALL WHOM IT MAY CONCERN:

Be it known that I, JAMES S. UPTON, of Battle Creek, in the county of Calhoun, and in the State of Michigan, have invented certain new and useful Improvements in Grain-Separator; and do hereby declare that the following is a full, clear, and exact description thereof, reference being had to the accompanying drawings, and to the letters of reference marked thereon.

In the annexed drawings, making part of this specification, A represents the frame of the machine. Near one end of this frame, and placed crosswise of it in a suitable concave box, is a threshing-cylinder, B. Both the concave and the cylinder are provided with suitable teeth for threshing grain. D D' D'' represent a series of sieves or perforated boards, which are hung in the frame at their rear ends, by means of the straps $a\ a$. Their forward ends are connected to crank-shafts $e\ e$. When these crank-shafts are revolved, the sieves have a rotary reciprocating motion communicated to them. The outer ends of the shafts $e\ e$, on one side of the frame, are provided with the pulleys I I, by means of which motion is given to said shafts. C represents a trough, which forms the bottom to the frame A, or rather to the grain-box of said frame. This trough is inclined slightly toward the rear of the machine, and has an endwise vibratory motion communicated to it by a rod, G, which connects to a crank-shaft, $g$, on the end of which is a pulley, J.

The trough C empties its grain into a box, E, at the rear of the machine. The grain, however, in falling from the trough to the box, is subjected to a blast of air from a fan, F, situated immediately under the rear end of the trough C. The fan is driven by means of a band, which passes around a pulley on the end of the threshing-cylinder shaft, and then around one on the end of the fan-shaft.

The grain is fed in to cylinder B in the straw, and, being threshed from the straw by said cylinder, falls into the trough C, and is carried back and emptied into box E. The straw falls upon the screen D, and is carried by its motion back to screen D', and then to D'', in like manner. The meshes of the screens are from one to two inches in diameter, and all grain which may have lodged in the straw is separated from it by the vibratory motion of the screens, and falls through into the trough C, and is carried back into box E.

The fan F removes all chaff from the grain as it is falling from the trough to the box.

What I claim, is—

1. The screens D D' D'', combined with the cylinder B, and operating in the manner set forth for separating the grain from the straw, substantially as specified.

2. The vibrating-spout C, in combination with a threshing-cylinder, and the series of screens D D' D'', when used substantially as and for the purpose set forth.

In testimony that I claim the foregoing, I have hereunto set my hand, this 9th day of      , 186 .

JAMES S. UPTON.

Witnesses:
R. A. LOOMIS,
HENRY S. BROOKS.